(12) United States Patent
Wardman et al.

(10) Patent No.: US 11,699,140 B2
(45) Date of Patent: Jul. 11, 2023

(54) GEOGRAPHIC LOCATION CONSENSUS DETERMINATION

(71) Applicant: PayPal, Inc., San Jose, CA (US)

(72) Inventors: Bradley Wardman, Phoenix, AZ (US);
Nathan Pratt, Scottsdale, AZ (US);
Ilya Chernyakov, Givat Shmuel (IL);
Yotam Perkal, San Jose, CA (US);
Yuri Shafet, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 266 days.

(21) Appl. No.: 16/731,976

(22) Filed: Dec. 31, 2019

(65) Prior Publication Data
US 2021/0201290 A1      Jul. 1, 2021

(51) Int. Cl.
*G06Q 20/32* (2012.01)
*G01S 19/10* (2010.01)

(52) U.S. Cl.
CPC .......... *G06Q 20/3224* (2013.01); *G01S 19/10* (2013.01)

(58) Field of Classification Search
CPC ............................ G06Q 20/3224; G01S 19/10
See application file for complete search history.

(56) References Cited

U.S. PATENT DOCUMENTS

| | | | |
|---|---|---|---|
| 9,128,170 B2 * | 9/2015 | Chu | G01S 19/40 |
| 9,155,125 B1 * | 10/2015 | Xue | H04L 63/123 |
| 9,282,430 B1 | 3/2016 | Brandmaier et al. | |
| 9,298,831 B1 * | 3/2016 | Heldt | G06F 16/951 |
| 10,063,529 B2 | 8/2018 | Milazzo et al. | |
| 10,222,942 B1 | 3/2019 | Zeiler et al. | |
| 10,735,528 B1 * | 8/2020 | Shafiullah | H04L 67/75 |

(Continued)

FOREIGN PATENT DOCUMENTS

WO      2011/126481 A1      10/2011

OTHER PUBLICATIONS

"Types of Sets," dated Jun. 16, 2012, Math-Only-Math, https://www.math-only-math.com/types-of-sets.html (Year: 2012).*

(Continued)

*Primary Examiner* — Gregory S Cunningham, II
*Assistant Examiner* — Raven E Zeer
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to determining whether geographic locations of a user computing device satisfy a location consensus threshold. A computer system receives results of a plurality of location determination operations, each of which specifies a geographic location of a computing device initiating an action. The computer system then makes a determination whether the received results satisfy a consensus threshold as to geographic location of the computing device. In some embodiments, the determination is usable to select, from a plurality of sets of rules for different geographic regions, a particular set of rules for processing the action. In some cases, the particular set of rules is usable to determine whether to process the action. Such techniques may advantageously allow a processing system to understand how to process actions initiated by a computing device associated with different geographic locations.

20 Claims, 10 Drawing Sheets

(56) References Cited

U.S. PATENT DOCUMENTS

| | | | |
|---|---|---|---|
| 2010/0248779 A1* | 9/2010 | Phillips | G06Q 20/409 |
| | | | 455/556.1 |
| 2012/0101942 A1* | 4/2012 | Park | G06Q 20/0457 |
| | | | 705/40 |
| 2012/0136796 A1* | 5/2012 | Hammad | G06Q 20/3674 |
| | | | 705/67 |
| 2012/0209773 A1 | 8/2012 | Ranganathan | |
| 2013/0046692 A1* | 2/2013 | Grigg | G06Q 40/00 |
| | | | 705/44 |
| 2015/0011260 A1* | 1/2015 | Agrawal | H04W 4/029 |
| | | | 455/456.3 |
| 2015/0046241 A1 | 2/2015 | Salmon et al. | |
| 2015/0087303 A1* | 3/2015 | Hillary | H04W 12/64 |
| | | | 455/435.1 |
| 2015/0148078 A1 | 5/2015 | Phillips et al. | |
| 2017/0109840 A1* | 4/2017 | Lu | H04W 12/02 |
| 2017/0302659 A1* | 10/2017 | Shteingart | H04W 12/065 |
| 2018/0188052 A1 | 7/2018 | Singh et al. | |
| 2019/0182494 A1* | 6/2019 | Li | H04N 21/23424 |
| 2019/0205849 A1 | 7/2019 | Nuzzi | |

OTHER PUBLICATIONS

Patrick Gleeson, "Business Transaction Definition & Examples," Chron, dated Jan. 31, 2019 https://smallbusiness.chron.com/business-transaction-definition-examples-25244.html (Year: 2019).*

"What is a CDN", Key CDN, dated Dec. 31, 2018 https://www.keycdn.com/what-is-a-cdn (Year: 2018).*

International Search Report and Written Opinion in PCT Appl. No. PCT/US2020/065213 dated Apr. 12, 2021.

* cited by examiner

```
                                                              900

┌─────────────────────────────────────────────────────────────────┐
│ Maintain, for different geographic regions, at least two        │
│ different sets of rules for performing an action via an         │
│ information service.                                            │
│                              910                                │
└─────────────────────────────────────────────────────────────────┘
                                  │
                                  ▼
┌─────────────────────────────────────────────────────────────────┐
│ Maintain location consensus criteria for one or more user       │
│ computing devices using the information service, where the      │
│ location consensus criteria are usable to select, using results │
│ of a plurality of location determination operations, one of the │
│ at least two different sets of rules.                           │
│                              920                                │
└─────────────────────────────────────────────────────────────────┘
                                  │
                                  ▼
┌─────────────────────────────────────────────────────────────────┐
│ Receive an indication of a request from a user computing device │
│ to initiate the action.                                         │
│                              930                                │
└─────────────────────────────────────────────────────────────────┘
                                  │
                                  ▼
┌─────────────────────────────────────────────────────────────────┐
│ Utilize the at least two different sets of rules and the        │
│ location consensus criteria to determine a particular set of    │
│ rules for processing the action.                                │
│                              940                                │
└─────────────────────────────────────────────────────────────────┘
```

*Fig. 9*

GEOGRAPHIC LOCATION CONSENSUS DETERMINATION

BACKGROUND

Technical Field

This disclosure relates generally to computer transactions, and, more specifically, to techniques for processing transactions according to geographic location.

Description of the Related Art

Transactions may be initiated by various user computing devices located at different geographic locations around the world. Accordingly, such transactions may fall under different jurisdictions that are associated with the different geographic regions. Within these jurisdictions, different rules exist for processing transactions. Often such transactions are conducted by mobile devices meaning that a transaction may be initiated at or close to a border dividing different geographic regions which are governed by different jurisdictions. In addition, mobile devices change locations often, and as such their geographic location is continually changing. In such situations, it may be difficult for a system processing these transactions to determine which jurisdiction a particular transaction falls under and by extension how to process the particular transaction.

BRIEF DESCRIPTION OF THE DRAWINGS

FIG. 9 is a flow diagram illustrating a method for utilizing sets of rules for different geographic regions to process an action initiated at a user computing device, according to some embodiments.

Figure 1:
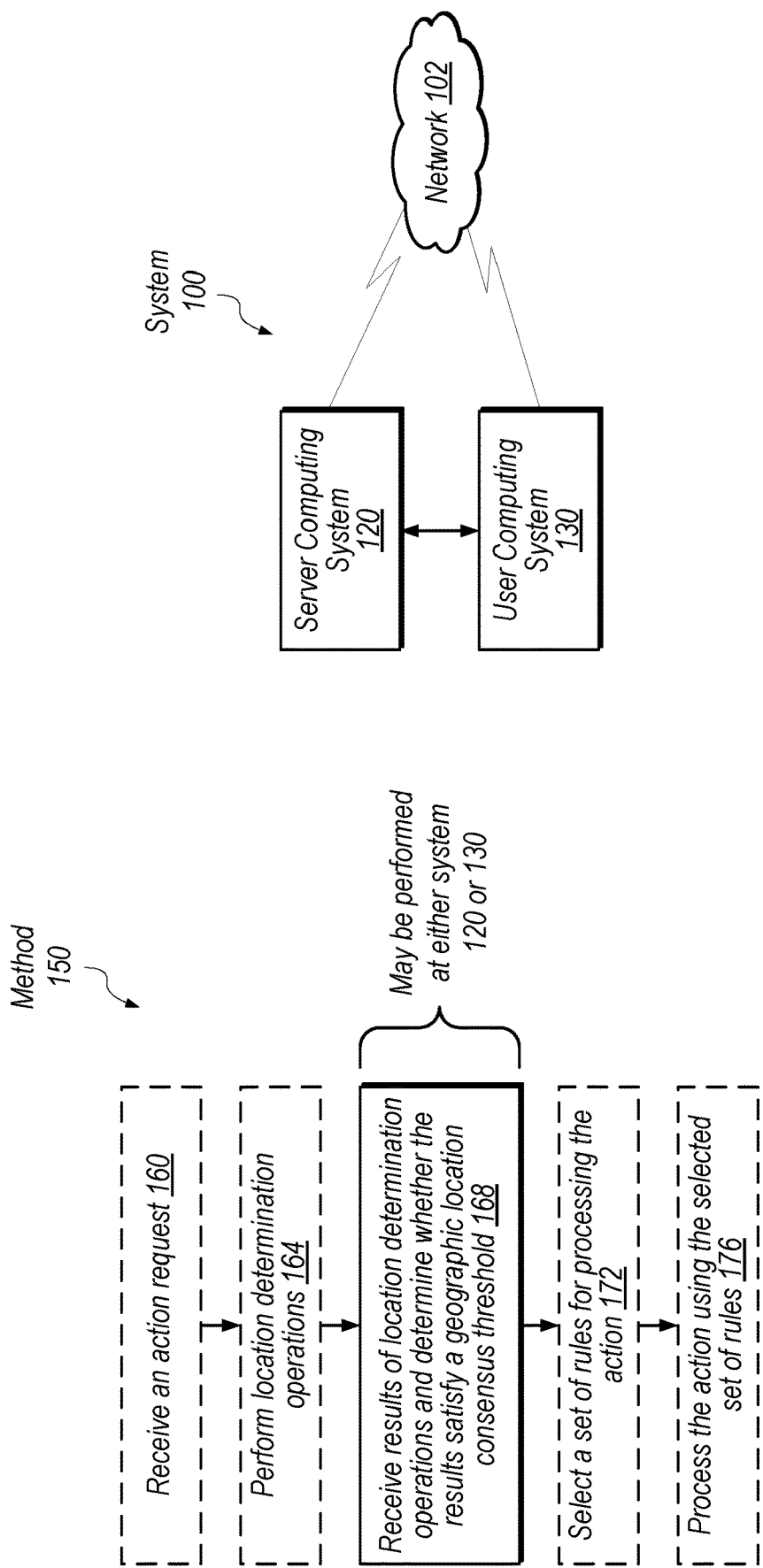
FIG. 1 includes both a block diagram and a flow diagram illustrating a system and method, respectively, for processing a user-initiated action based on results of geographic location determination operations, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "server computer system configured to determine whether a location consensus threshold is satisfied" is intended to cover, for example, a computer system that performs this function during operation, even if it is not currently being used (e.g., when its power supply is not connected). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Techniques are disclosed for processing various actions based on determining whether geographic locations of a user device initiating the actions satisfy a location consensus threshold. The various actions may be transactions initiated by a user at their user device. In the context of a payment transaction, a user may be requesting to send money to another person via their device. In this situation, depending on one or more determinations of geographic location of the user device, a transaction processing system may decide how to process the requested transaction. This decision may include determining whether the transaction is approved or rejected. The term "geographic location" refers to a position on the Earth, and may be defined specifically (e.g., with particular coordinates) or generally (e.g., by specifying that the user device is within a particular geographic region). The present disclosure, however, is intended to broadly cover processing of any type of action initiated at the user device. This may include for example, a request by a user to: access information (e.g., an account, a file, etc.), copy information, perform a payment, etc. In some cases, processing an action may include determining whether to notify a user of rules associated with a particular geographic region when they enter that geographic region.

As used herein, the term "geographic region" refers to a demarcated area associated with a general location that is in distinction to and divided from other areas associated with different locations. In some situations, a geographic region is under the jurisdiction of a governing body and/or a set of rules or laws. As one specific example, a user device that is located in a first geographic region may be subject to different regulations, laws, transaction rules (e.g., currency conversion rules), coupons or special offers, products, etc. than a user device located in a second geographic region. As traveling becomes more common (and more frequent) and as transaction laws within different geographic regions become more complex it is important to quickly and accurately identify current geographic regions of different user devices requesting processing of various actions and to offer such processing according to these identified regions.

Traditional transaction processing might be performed based on a particular country in which a user registered an account with the system processing the transaction. In some situations, however, a user's registration country may not match a country in which the user is currently located when they submit a transaction request. In such situations, if the transaction processing system were to process the transaction according to regulatory rules of the registration country, it may be violating regulatory rules of the country in which the user is currently located. For example, in the context of a payment transaction, a first country may permit free person-to-person payments, while a second country may apply a payment fee to such transactions. In this example, according to traditional processing techniques, a person with an account registered in the second country would still be required to pay transaction fees even when they are requesting a transaction in the first country (which does not require fees).

The present inventors have recognized that these issues relating to geographic region identification may be addressed in various ways, including by evaluating geographic location information associated with a user device that has been obtained from multiple different data sources. One such data source may include an edge server of a content delivery network accessed by the user device. In an example situation where the user device is a cell phone, another of the different data sources used to obtain geographic location information associated with the user device may include various cellular towers in communication with the cell phone.

The present disclosure describes evaluation techniques that include a comparison of different geographic location information to determine whether a consensus exists between geographic regions (e.g., whether the regions match) specified by these multiple different data sources. In addition to using geographic location information from various data sources, the disclosed techniques utilize various sets of rules associated with different geographic regions to determine whether and how to process actions initiated by user devices. In this way, the disclosed techniques may provide more accurate processing of transactions and, in turn, may be able to provide users with access to services available according to their current location, even when such services are unavailable according to their registration or prior location.

The present disclosure describes evaluation techniques for determining the geographic location of a user device even in situations where certain location data is faulty or inaccurate. For example, although global positioning system (GPS) data may typically be used to locate a user device, this information may not be available in some cases, may be degraded to a point of inaccuracy, may be spoofed, etc. As a result, disclosed techniques advantageously evaluate geographic location information from various other sources either in combination or in place of GPS data. For example, disclosed techniques may evaluate a list of nearby cell towers, Wi-Fi access points, and latitude and longitude coordinates for a particular user device in order to determine a geographic location for that device. This may advantageously prevent a user from obfuscating their geographic location by falsifying one or more portions of geographic location information associated with their device.

Example Server and User Computing Systems

FIG. 1 includes both a block diagram and a flow diagram illustrating a system 100 and method 150, respectively, for processing (either by server computing system 120 or user computing system 130) a user-initiated action based on receiving results of geographic location determination operations. In the illustrated embodiment, system 100 includes a server computing system 120 and a user computing system 130 in communication via network 102.

In some embodiments, server computing system 120 utilizes an information service for processing transaction requests from user computing system 130. These transactions may include payment transactions requested by a user associated with system 130. In some embodiments, server computing system 120 processes various actions performed by a user associated with user computing system 130. For example, a user may request payment rules and system 130 determines a current geographic location of the user computing system and provides payment rules for that region. Note that a geographic region may also be referred to as a "jurisdiction." For example, a country or city that occupies a specific geographic region may be associated with a particular jurisdiction. In some cases, the transaction rules requested by the user may be associated with a particular geographic region and may specify, for that region, guidelines for processing various transactions.

Method 150, in the illustrated embodiment, includes various steps with a step 168 that may be performed at either system 120 or 130. At step 160, a computing system, may receive an indication of an action requested by a user associated with user computing system 130. In some embodiments, this indication includes a request to process a transaction. At step 164, the computing system performs one or more location determination operations to determine geographic locations associated with the user computing system 130. In some embodiments, these location determination operations use different data sources to determine these geographic locations. This may be advantageous in allowing a computer system to determine a current accurate location of a user device for action/transaction processing, even in situations where the user device is relocating often, is near a border between two or more geographic regions, is attempting to obscure their location, or any combination thereof. Example location determination operations performed using different data sources are discussed in detail below with reference to FIG. 5.

As used here the terms "action" and "transaction" are both intended to be broad. The term "action" refers to any of various user-initiated activity. Examples of actions include a user requesting to log into a service from a mobile device, attempting to access a file, etc. A "transaction" is intended to refer to an action that involves multiple entities. Thus, a user sending money to another user is an example of a payment transaction. In general, any references in this disclosure to attributes of an "action" are applicable to a "transaction," and vice versa, unless otherwise indicated.

At step 172, the computing system selects a set of rules for processing the action. In some embodiments, different sets of rules are associated with different geographic regions and specify how to process actions requested within the different geographic regions. In some embodiments, these rules are payment rules used to process a payment transaction. At step 176, the computing system processes the action using the selected set of rules. In some embodiments, the selected set of rules specifies to authorize the action. In other embodiments, the selected set of rules specifies to process the action based on the different geographic locations included in the results of the location determination operations. Example sets of region rules are discussed below with reference to FIG. 4. Note that each of the steps of method 150 may be performed by server computing system 120, user computing system 130, or any combination thereof. Examples of the many different ways in which method 150 may be performed are described further below.

Figure 2:
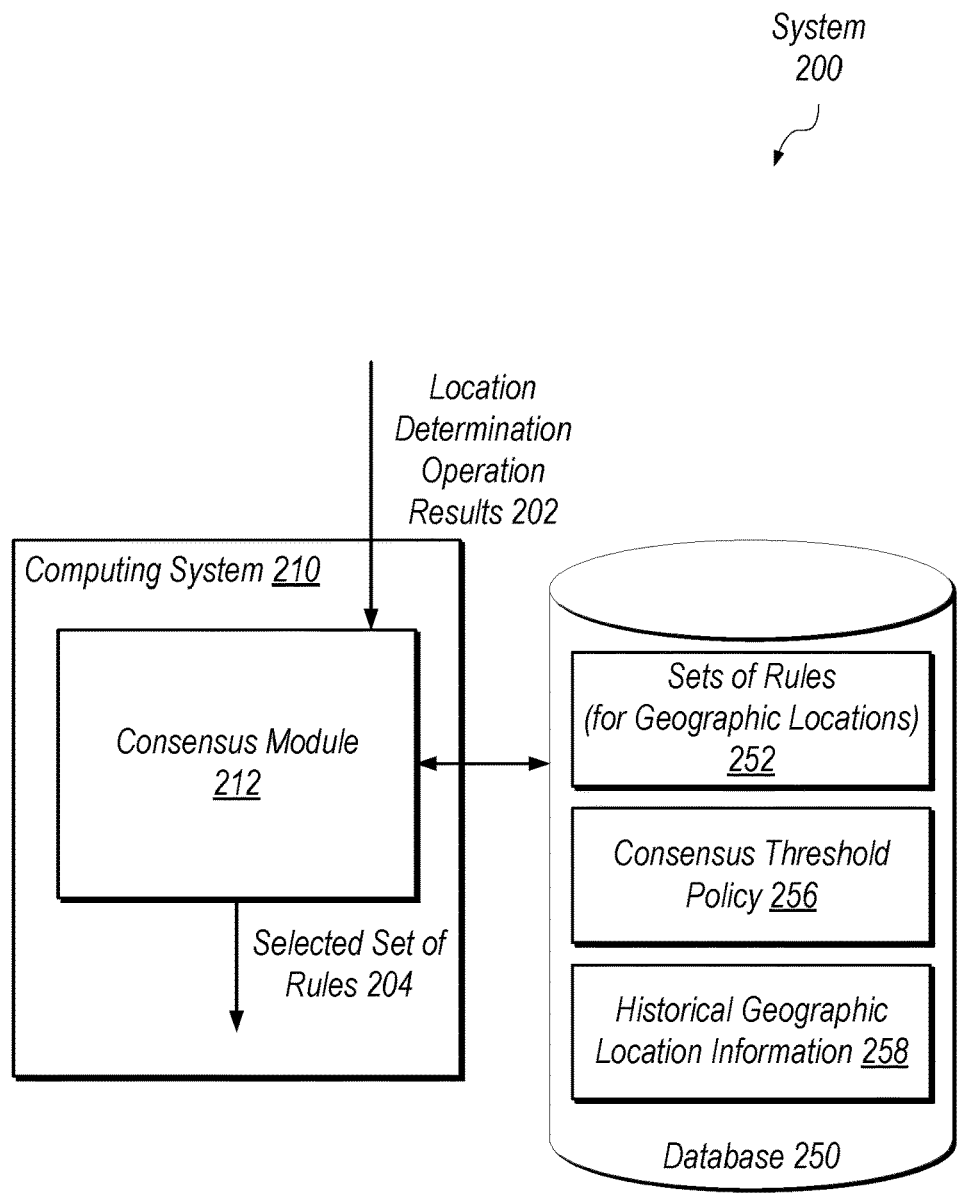
FIG. 2 is a block diagram illustrating an example computing system for determining a geographic location consensus, according to some embodiments.

FIG. 2 is a block diagram illustrating an example computing system 210 for determining whether a geographic location consensus exists. In the illustrated embodiment, system 200 includes computing system 210 and database 250. Note that computing system 210 may be a server (an example of system 120) or a user device (an example of system 130), as the concepts of the present disclosure may be implemented in various different ways.

Computing system 210, in the illustrated embodiment, receives location determination operation results 202, which may come from different sources, including sources internal or external to system 210. In some embodiments, these results include information specifying geographic locations associated with a user device that are determined using different wireless data sources. Computing system 210 then provides the results 202 to consensus module 212.

Consensus module 212, in the illustrated embodiment, accesses database 250 to obtain a consensus threshold policy 256. Module 212 then determines whether a consensus exists between different geographic locations specified in the location determination operation results 202 based on the consensus threshold policy 256. Consensus threshold policy 256 is used to resolve discrepancies between results of different location determination operations. For example, when one or more locations determined by performing different location determination operations do not fall within the same geographic region, policy 256 is used to specify which geographic region to select (e.g., which region to associated with the user device). Policy 256 may be implemented in a variety of ways. In some cases, the policy may indicate a "majority rules" policy—that is, the geographic region that is indicated by a majority of location determination operations is selected. In other cases, a specific rule may be utilized that weights the results of various location determination operations more heavily than others. Consider a scenario in which five location determination operations are performed, and region A is indicated by 3 operations, while region B is indicated by 2 operations. In a majority-rules scenario, region A would be selected. But in a scenario in which a weighting is performed, region B might be selected in some instances, such as where the two location determination operations considered most accurate indicate region B. In some cases, policy 256 may initially reach an indeterminate result, and ask the user to perform additional operations (or initiate operations automatically) in order to make a consensus determination. Consensus threshold policy 256 may include weights that place a greater importance on geographic location determination operations that provide information indicating proximity to Bluetooth beacons, cell tower data, Wi-Fi hotspot data, etc. and weights that place lesser importance on information that is directly reported by the user of user device 320, such as a contact address of the user. Such weighting may be performed in situations where different sources of geographic location information for a user device do not indicate the same geographic region.

After evaluating the results 202 using consensus threshold policy 256, consensus module 212 accesses database 250 to select one of the sets of rules 252 for different geographic locations. In the illustrated embodiment, consensus module accesses database 250 to obtain historical geographic location information 258 for a user device. In some embodiments, historical geographic location information 258 indicates a length of time that the user device has been located in a particular geographic location. For example, the historical geographic location information 258 may indicate that a user device has been located in the United States for the past thirty days. In some cases, information 258 may include previous location consensus determinations. This timing information may be used by consensus module 212, in addition to a consensus determination, to select a set of rules 204 for processing an action request. If, for example, information 258 indicates that a user device has been in a particular geographic region for more than 90 days, consensus module 212 may select a set of rules 252 based on this information 258 and the consensus determination.

In the illustrated embodiment, consensus module 212 outputs a selected set of rules 204. Sets of rules 252 may include processing guidelines for requests (e.g., for actions or transactions) from the user device that are specific to different geographic regions. For example, in some situations, a particular set of rules 252 may specify to reject a requested transaction. In other situations, a particular set of rules 252 may specify to authorize a requested transaction. In some cases, a particular set of rules 252 may specify instructions for how to process a transaction. For example, for a particular geographic region, a set of rules 252 may specify data hosting laws (e.g., specifying how data may be stored and transmitted) that must be satisfied by the transaction prior to authorization. As another example, a particular set of rules 252 may specify that a payment transaction must be processed using databases that are located within the geographic region associated with the payment transaction.

In some situations, sets of rules 252 specify laws for protecting user's personal data (e.g., the United States general data protection regulation (GDPR), India's personal data protection bill, Brazil's LGPD, etc.). One set of rules 252 may specify that certain products cannot be mailed, but must be picked up in person, even if purchased online (e.g., knife sales in the United Kingdom) or may specify that certain goods or services (e.g., gambling) are prohibited altogether for a particular geographic region. For money transfers in certain geographic locations, sets of rules 252 may specify requirements for and limits on the amount (e.g., certain amounts are prohibited and certain amounts must be reported). As one example, Spain may prohibit physical cash transfers over €2,500 and Germany may prohibit those over €12,500.

Example Server-Side Processing

Figure 3:
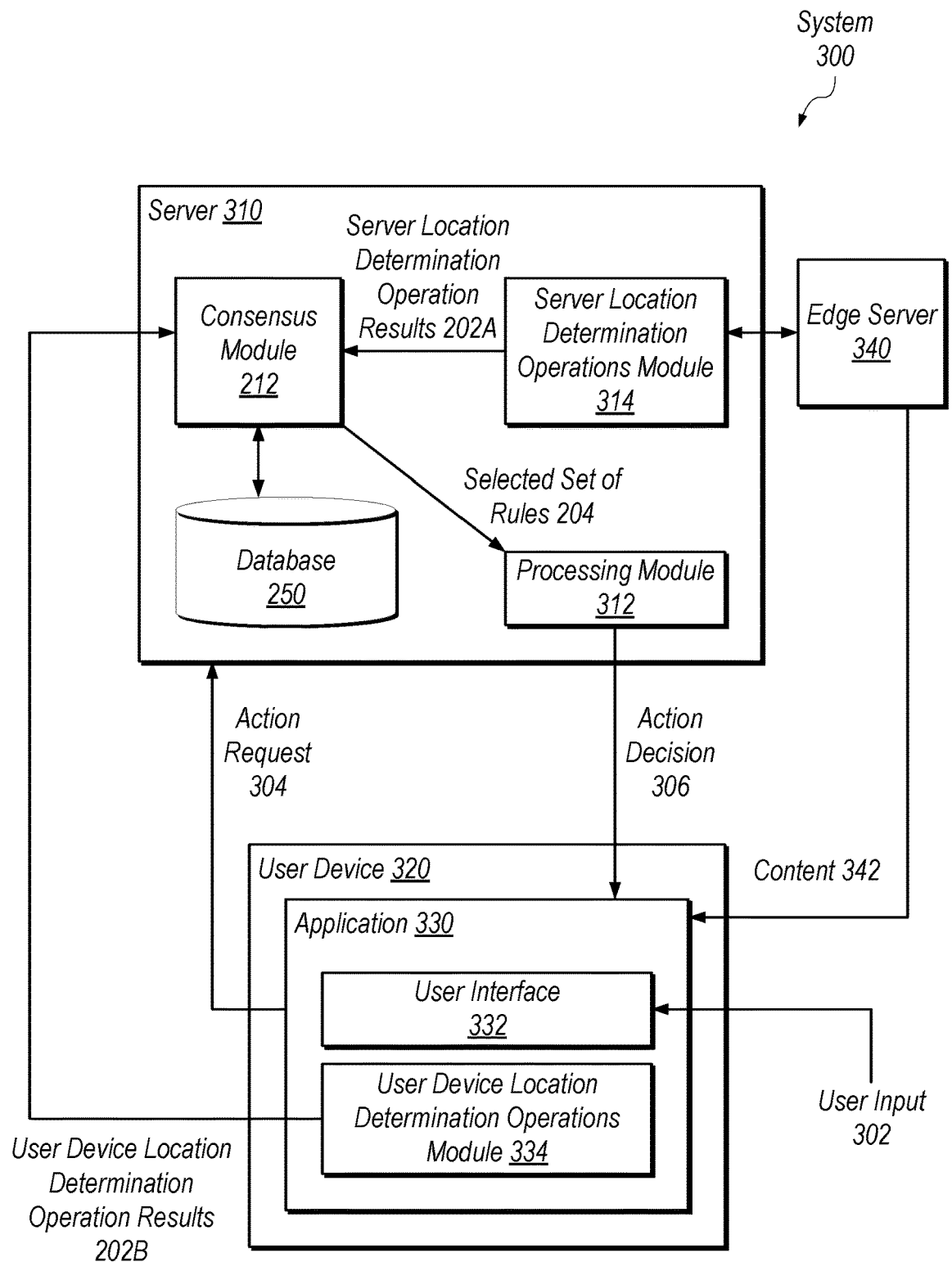
FIG. 3 is a block diagram illustrating example interaction between a server and user device for processing a requested action based on location determination operation results, according to some embodiments.

FIG. 3 is a block diagram illustrating example interaction between a server 310 and a user device 320 for processing a requested action based on location determination operation results 202. In the illustrated embodiment, system 300 includes a server 310, user device 320, and an edge server 340 in communication for processing an action request 304.

As used herein, the term "edge server" is intended to be construed according to its well-understood meaning, which includes a computer system that provides an entry point into a computer network for one or more end users and exists at a geographical location that provides content of the computer network to the one or more end users with fewer connections. Edge servers may exist at the edge of a content delivery network (CDN) and may store content of the CDN closer to an end user device than a central server of the CDN. Note that a content delivery network may also be referred to as a content distribution network. In some situations, edge servers may reduce network latency and thus improve load times.

Edge server 340, in the illustrated embodiment, provides content 342 to application 330. In some cases, edge server 340 is located in a geographic location that is the same or similar to that of user device 320 and, therefore, provides content 342 to the user device from a central server that is not located in a different geographic region than the user device. In some situations, edge server 340 stores content from a central server locally and communicates with various other edge servers of a CDN to provide content 342 to devices at different locations. For example, if user device 320 is located in Australia and is accessing a website hosted by a central server located in North America, an edge server 340 that is also located in Australia would provide a local access point for the central server to user device 320. In some cases, edge server 340 may reduce network times for requests from user devices 320 by using technologies (e.g., anycast) to select the fastest edge server that is located near the user device (e.g., the edge server that is closest in proximity to the user device).

Edge server 340 may be used to determine a geographic location of user device 320. For example, if different user devices are located in a geographic region and are utilizing a certain set of edge servers, then this set of servers are most likely the closest in proximity to the geographic region. In some cases, a list of edge servers with previously confirmed geographic locations is used to determine the location of user device 320 (based on user device 320 accessing one of the servers on the list). In some situations, user device 320 may report a particular geographic location that does not correspond to a set of edge servers accessed by the user device. In some situations, due to network issues or other reasons, user device 320 may communicate using a less efficient route (i.e., an edge server that is further away). In these situations, the geographic location of the user device may require further investigation e.g., using various other disclosed sources of geographic location information.

User device 320, in the illustrated embodiment, implements an application 330, which includes a user interface 332 and a user device location determination operations module 334. User device 320 may be any form of computing device associated with a particular user, including: a mobile device (e.g., a cell phone, a tablet, a wearable, a laptop, etc.), a stationary device (e.g., a desktop computer), etc. Application 330, in the illustrated embodiment, interfaces with edge server 340 to obtain content 342. In some embodiments, application 330 displays the content 342 via user interface 332.

User interface 332, in the illustrated embodiment, receives user input 302 from a user associated with user device 320. User input 302 may include one or more of the following: a transaction request, a change to location settings for user device 320, a request to access information (e.g., files, accounts, etc.), a search request (e.g., via a search engine), etc. In some embodiments, user input 302 involves one or more actions performed by the user. For example, a user may move their user device 320 from one location to another, without providing input via interface 332, but this location change may be registered as user input by user device 320 and, in turn, may cause the user device to perform various actions.

User device location determination operations module 334, in the illustrated embodiment, performs one or more location determination operations to determine various geographic locations for user device 320. In the illustrated embodiment, based on performing such operations, module 334 sends user device location determination operation results 202B to a consensus module 212 of server 310. (Consensus module 212 is discussed in detail below with reference to FIG. 4.)

Server 310, in the illustrated embodiment, includes consensus module 212, database 250, server location determination operations module 314, and a processing module 312. Server 310 receives an action request 304 from user device 320. In addition, consensus module 212, receives user device location determination operation results 202B from module 334 of the user device 320. Based on these results and the server location determination operation results 202A received from module 314, consensus module 212 accesses database 250 to determine whether a consensus threshold has been satisfied. Then consensus module 212 selects a set of rules from database 250 and sends this set of rules 204 to processing module 312. Note that database 250 may be maintained externally to server 310 and may be accessed by the server while processing the action request 304.

Processing module 312, in the illustrated embodiment, processes action request 304 based on the selected set of rules 204 received from consensus module 212. Module 312 then sends an action decision 306 to application 330. In some embodiments, action decision 306 specifies that a transaction has been authorized. Application 330 may then render user interface 332 such that it displays a message according to the action decision 306. In some embodiments, the rendered user interface 332 displays both a transaction decision (e.g., specifying that the transaction has been authorized) and a selectable element (e.g., a button or link). In some cases, the element is selectable by the user of user device 320 to cancel the authorized transaction. In some embodiments, user interface 332 displays payment rules or regulatory rules associated with a particular geographic region assigned by server 310 to user device 320 (for a particular action request 304). In some situations, user interface 332 may notify the user of device 320 that they are located in a country that does not allow streaming of a certain type of movie when that user is attempting to stream such content. In other situations, interface 332 may inform the user of device 320 that person-to-person payment transactions initiated in a particular country include a transaction fee. Other examples of notifications that may be provided to a user of user device 320 may pertain to: fees, service charges, taxes, special delivery requirements (e.g., in-person pickup for weapon purchases), digital currency rules, etc.

In some embodiments, consensus module 212 may initially determine, according to the consensus threshold policy 256, that location determination operation results 202 do not satisfy a location consensus threshold. In some situations, server 310 may transmit an instruction to application 330 for display via user interface 332. This instruction may be a message specifying for the user to perform one or more actions, including one or more of the following: submitting authentication information (e.g., authentication documents, account credentials, etc.), logging in to an account via an application installed on their mobile device, updating location settings on their user device, moving around in a particular location (e.g., to obtain Wi-Fi/Bluetooth signals from other computer devices in the same geographic location), etc. In some embodiments, based on the user performing one or more actions specified by the instruction, server 310 may select a set of rules for processing action request 304.

In other embodiments, based on results 202 not satisfying a location consensus threshold, server 310 may perform one or more of the following actions: reject the action request 304, obtain additional geographic location information, or evaluate whether the action request can be processed according to multiple different geographic regions. For example, server 310 may perform and/or instruct user device 320 to perform one or more additional location determination operations. As another example, server 310 may not process the action request 304 and may send a decision 306 to user device 320 indicating that the action has been rejected. As yet another example, server 310 may attempt to process action request 304 according to the requirements of multiple jurisdictions. In situations where the requirements of the multiple jurisdictions are conflicting, the transaction may be put on hold until further location determinations can be made or the system may revert to the user's original geographic location (e.g., their registration address) until further information can be collected. In some cases, account activities of a user of user device 320 may trigger regulatory actions (e.g., know your customer laws) in one or more of the geographic regions associated with the user device. In such cases, the user of user device 320 may be prompted to complete the requirements of these regulatory actions in order for the action request 304 to be processed.

Although FIG. 3 illustrates an embodiment in which server 310 performs various steps for processing an action request from a user device, in other embodiments user device 320 may perform one or more of these steps. For example, in some cases, application 330 installed on user device 320 may include a consensus module such as module 212 for determining whether results of location determination operations satisfy a location consensus threshold. In this example situation, user device 320 receives a plurality of sets of rules from server 310 for different geographic regions. In some embodiments, user device 320 downloads sets of rules 252 from server 310 after receiving user input 302. In other embodiments, server 310 pushes rules to the user device periodically. In some cases, user device 320 receives the consensus threshold policy 256 from server 310, performs a consensus determination via a consensus module, and then requests a particular set of rules 252 from server based on the consensus determination outcome.

In embodiments where the user device 320 is determining whether a consensus exists between geographic locations, server 310 may provide server location determination operation results 202A to application 330. In such situations, application 330 evaluates geographic locations included in both results 202A and 202B. Application 330 then selects a set of rules 252 from a plurality of sets of rules received from server 310 and processes action request 304 based on the selected set of rules. After processing the request 304, application 330 displays a result via user interface 332.

In some embodiments, application 330 evaluates results 202 and provides a consensus determination outcome to server 310. In some cases, server 310 selects a set of rules 252 based on the received outcome and provides these rules to application 330. In other cases, server 310 selects a set of rules 252, processes action request 304 based on those rules, and then provides action decision 306 to user device 320. Note that any of various combinations of these implementations may be performed at server 310 or user device 320 or any combination thereof. For example, consensus module 212 may be implemented at server 310 or by application 330 at user device 320 to determine a set of region rules for processing an action request 306 as discussed with reference to FIG. 4.

Example Consensus Module

Figure 4:
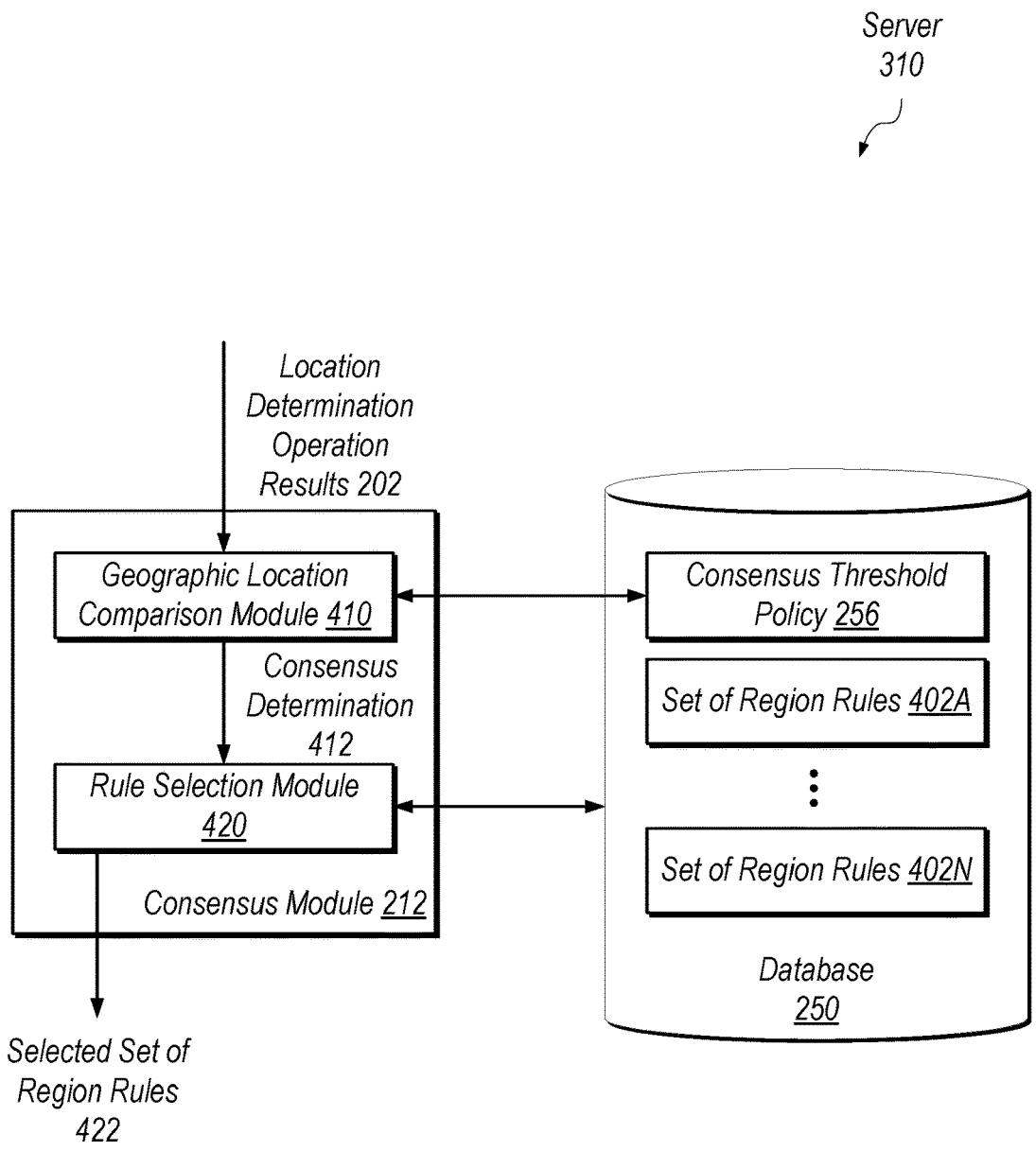
FIG. 4 is a block diagram illustrating an example consensus module, according to some embodiments.

FIG. 4 is a block diagram illustrating an example consensus module. In the illustrated embodiment, consensus module 212 includes a geographic location comparison module 410 and a rule selection module 420 in communication with database 250 for processing an action requested by a user device.

Geographic location comparison module 410, in the illustrated embodiment, receives location determination operation results 202 (which may include results from operations performed by server 310 or user device 320). Module 410 then compares geographic locations included in the results to determine if they fall within the same geographic region. After comparing the different locations, module 410 accesses database 250 to obtain consensus threshold policy 256. Based on the policy 256, module 410 sends consensus determination 412 to rule selection module 420. Consensus determination 412 may specify a geographic region selected by module 410 for a particular action requested by user device 320. In some embodiments, geographic location comparison module 410 is trained using machine learning techniques to identify and select a particular geographic region for a user device in situations where multiple geographic locations determined for a user device (specified in results 202) do not correspond to the same geographic region. For example, a supervised machine learning classification algorithm may be used to train geographic location comparison module 410 using previously determined user geographic location information and previously assigned geographic regions that are known to be correct.

Rule selection module 420, in the illustrated embodiment, receives consensus determination 412 from geographic location comparison module 410 and accesses database 250 to obtain various sets of region rules 402A-402N applicable for processing actions initiated at user device 320. Rule selection module 420 then selects a particular set of region rules 402 corresponding to a geographic region specified in consensus determination 412. In the illustrated embodiment, rule selection module 420 outputs a selected set of region rules 422 for processing a user-initiated action. In some embodiments, the consensus determination 412 specifies both a geographic region and a time at which the user entered the geographic region. In some embodiments, rule selection module 420 selects a set of region rules based on the length of time the user has been in the geographic region. For example, if a user from region X is detected as being in region Y for three, four, five, etc. days, this may cause module 420 to select rules specifying restrictions for one or more goods or services offered in that region. If, however, the user from region X is detected as being in region Y for more than 90, 100, 200 days, module 420 may select a different set of region rules 422 (e.g., know your customer laws, tax filing laws, etc.).

Example Location Determination Operations

Figure 5:
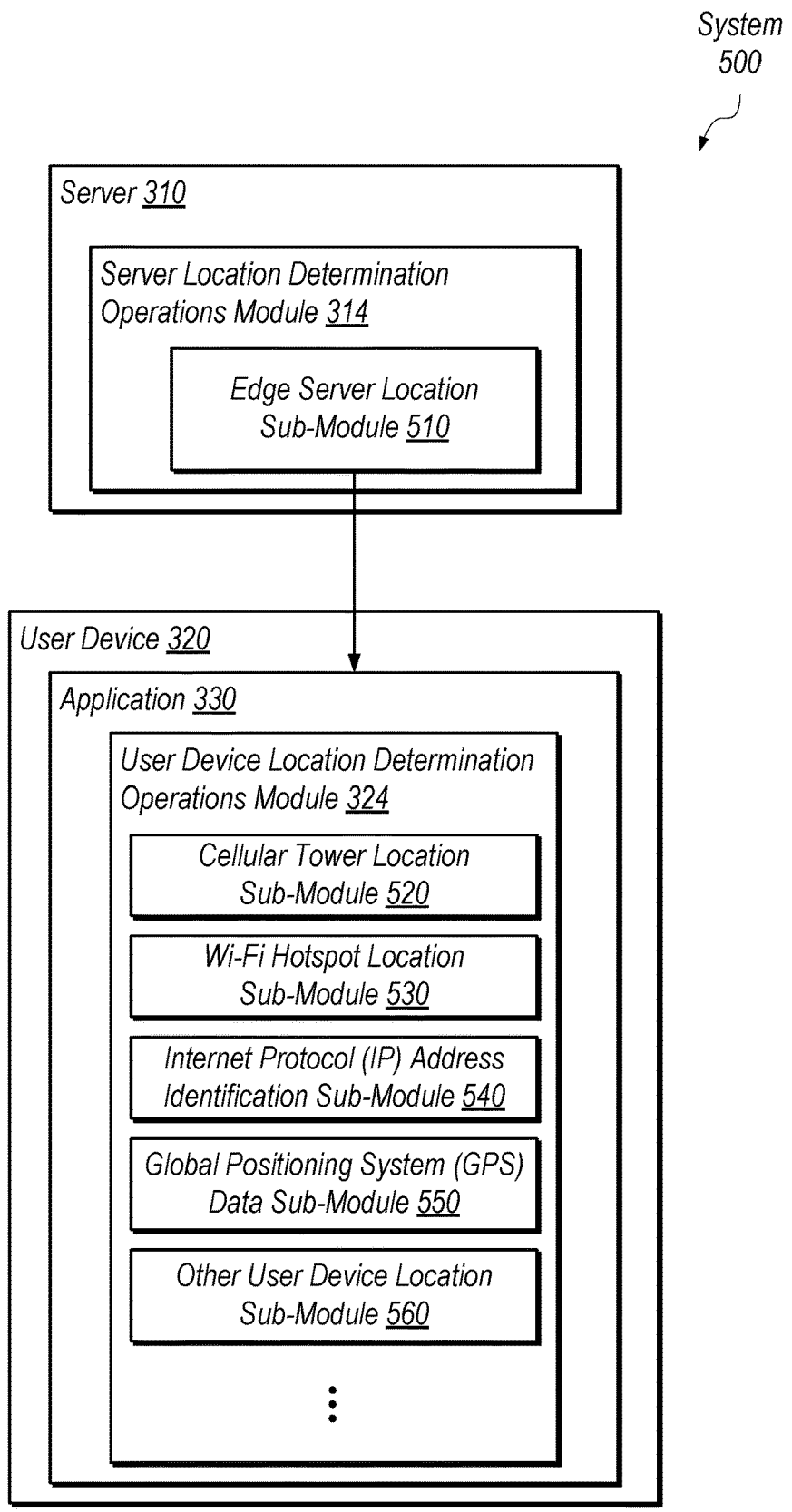
FIG. 5 is a block diagram illustrating example location determination operation sub-modules, according to some embodiments.

Turning now to FIG. 5, a block diagram is shown illustrating example location determination operation sub-modules used to determine the location determination operation results 202 evaluated by consensus module 212 in FIG. 4. In the illustrated embodiment, system 500 includes server 310 and user device 320 with various location sub-modules for determining location information.

Server location determination operations module 314 includes an edge server location sub-module 510. Module 510 may be used to collect various information from one or more edge servers of a content delivery network that have been accessed by user device 320. A content delivery network associated with server 310 may include edge servers that are located in various different geographic regions. As one specific example, a user device 320 located in North America may request content that is stored in a data center in Asia. This may cause latency in data transmission (e.g., ten, twenty, thirty second delays). Therefore, the content delivery network may instruct the user device 320 to obtain the content from an edge server located in North America (rather than from a server in Asia). In some situations, edge server location sub-module 510 collects information from the North American edge server accessed by user device 320. For example, module 510 may scrape a list of user devices maintained by the edge server that indicate devices that have accessed the server and, based on user device 320 being included on this list, the module stores a geographic location of this edge server. In the illustrated embodiment, edge server location sub-module 510 sends location information collected from one or more edge servers to payment application 330.

Location determination operations module 324, in the illustrated embodiment, includes the following sub-modules for determining location information from various different data sources: cellular tower location sub-module 520, Wi-Fi hotspot location sub-module 530, internet protocol (IP) address identification sub-module 540, global positioning system (GPS) data sub-module 550, and other user device location sub-module 560.

Cellular tower location sub-module 520 determines one or more cellular towers that are currently interfacing with user device 320. Based on determining the locations of these cellular towers, module 520 may determine an approximate geographic location of the user device 320.

Wi-Fi hotspot location sub-module 530 determines one or more server set identifiers (SSIDs) for one or more Wi-Fi access points (e.g., hotspots) accessed by user device 320. Based on this information, sub-module 530 identifies one or more geographic locations assigned to these access points (e.g., based on the IP addresses of the hotspots). For example, sub-module 530 may access a database to identify geographic locations associated with the determined SSIDs. Sub-Module 530 then determines an approximate geographic location for the user device 320 based on one or more geographic locations associated with the Wi-Fi access points. In some cases, sub-module 530 evaluates Wi-Fi hotspots, determined SSIDs, signal strength, a database of Wi-Fi SSIDs, and a detected geographic location (obtained commercially, from other sources, etc.) to determine an approximate geographic location of user device 320.

IP address identification sub-module 540 determines that the IP address of the user device 320 is included in a chunk of IP addresses included in an autonomous system (AS). As used herein, the term "autonomous system" is intended to be construed according to its well-understood meaning, which includes a collection of IP routing prefixes associated with a given entity or domain that are controlled by a particular network provider or operator. After identifying an autonomous system which the IP address of the user device is included in, sub-module 540 may determine a geographic location of the autonomous system and associate this geographic location with the user device 320. The geographic location of the autonomous system may be inferred by collecting a regional internet registry associated with the autonomous system, WHOIS information, and related information available from various sources, including but not limited to, regional internet registries (e.g., American Registry for Internet Numbers (ARIN), European IP Networks, etc.), or commercially available sources.

In some embodiments, sub-module 540 evaluates border gateway protocol (BGP) data provided to the identified autonomous system. Border gateway protocol data may specify routing and reachability information to various autonomous systems on the internet and may assist such systems in making efficient routing decisions. In some embodiments, in addition to geographic related information, sub-module 540 may evaluate peer data for an autonomous system, including upstream and downstream information. Peer data may be collected for the autonomous system of the user device 320 as well as any other computer system that is a peer of the autonomous system (or a peer of one or more of the other computer systems). That is, peer data may be collected from various different levels of peers of the autonomous system. Sub-module 540 may evaluate this aggregated peer data to determine if an inferred geographic location of the autonomous system matches the geographic location of the user device 320 determined from other sources.

As one specific example, a user, normally located in the United States, is detected via both GPS and cell tower information to be located in New Zealand. The IP address 155.63.200.1 of the user device, however, indicates the United States (indicated by a commercial geolocation service). This IP address is being advertised by range 155.63.200.0/24 from an autonomous system AS133145 with a geographic location of Australia. WHOIS information for this IP address indicates contacts in both Australia and New Zealand, and this IP address is associated with the Asia-Pacific Network Information Centre (APNIC) Regional Internet Registry. In this example, a peer of the autonomous system AS4768 Vodafone NZ, Ltd. is located in New Zealand and peers of this peer computer system have geolocations across Australia, New Zealand, and the United States. In this example, based on these sources of information, application 330 determines that the geographic locations of the user device are in harmony and selects New Zealand as the geographic region of the user device 320.

In contrast, as another example, a user device 320 that is registered with a transaction processing system in the United States has an IP address 95.85.81.1 indicating the United States. This IP address is advertised by IP range 95.85.81.0/24 and common geolocation services place this IP address in the United States. The autonomous system AS200557 of the user device indicates Russia as its geographic location and is associated with European IP networks. Peer data of the autonomous system also indicates Russia. Based on this information, application 330 may determine Russia as the geographic region of the user device 320. If geographic location information for user device 320 does not match, indicating suspicious activity, sub-module 540 may specify the suspected suspicious activity in location information provided to application 330 or server 310 which in turn may be considered when determining a location consensus for this device 320.

GPS data sub-module 550 accesses data provided by a GPS system of user device 320. This data may include information collected from various satellites and positioning stations on the earth that indicate positions and times for various different objects on the earth. For example, GPS data may specify latitude and longitude (and in some cases altitude) of user device 320 at any given time. Module 550 may use GPS data to assign a geographic position to user device 320, which application 330 may provide during processing of transactions for a user of user device. As discussed above, in some situations, GPS data may not be available and, as a result, geographic location information from various other sources may be used either in combination or in place of GPS data to determine a geographic region for user device 320.

Other user device location sub-module 560 may monitor similar data sources as those monitored by modules 510-550, but for other user devices, such as those in the same vicinity as user device 320. For example, module 560 may determine if various user devices (that are known to be in a particular geographic region) are showing the same Wi-Fi hotspots, cellular towers, etc. as the user device 320. Based on this information, payment application 330 may ascertain whether other geographic location information collected for user device 320 has been falsified. In some embodiments, other user device location sub-module 560 is included in server 310. For example, after determining that user device 320 is associated with a particular autonomous system, server 310 may monitor activity of other user devices associated with that autonomous system. For example, server 310 may determine whether these other user devices report the same or similar cellular tower information as that reported by user device 320.

In some embodiments, location determination operations module 324 includes various other sub-modules for determining different location data for user device 320. For example, another module may monitor virtual personal network (VPN) traffic for user device 320. This information may be useful in identifying whether a user of device 320 is attempting to hide or otherwise confuse their location information for application 330. As one example, a user of a mobile device with an installed payment application may be located in Canada, but is attempting to make a purchase via their application in the United States. In some embodiments, a sub-module of modules 314 and 324 may review registration information of a user account registered using application 330. For example, this information may specify a physical address, various contact information (e.g., a phone number that includes an area and/or country code), etc. for the user of device 320. This information may be used by consensus module 212 when determining whether and how to process a transaction request.

Example Consensus Determination

Figure 6:
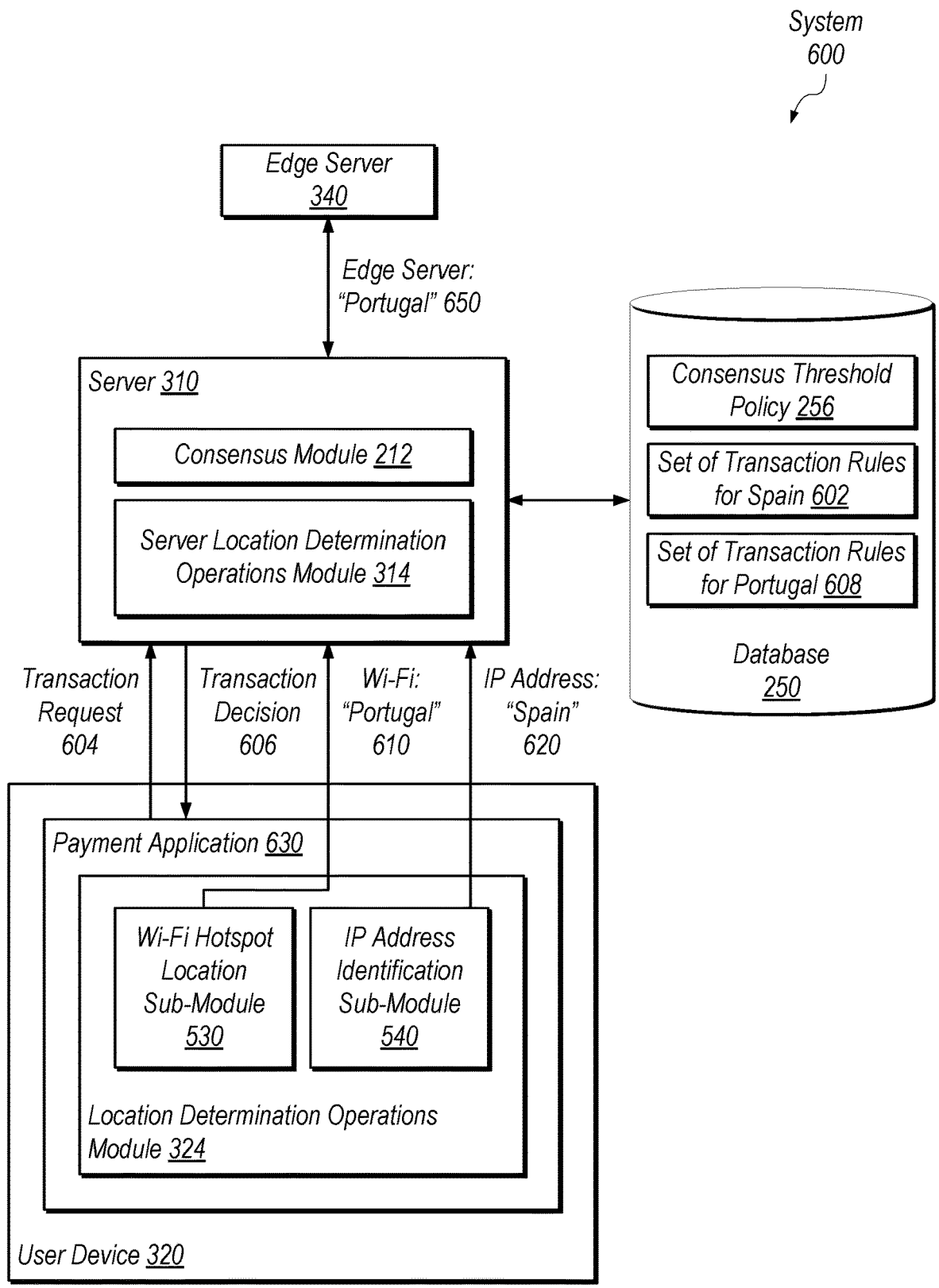
FIG. 6 is a block diagram illustrating an example geographic location consensus determination involving two different geographic locations, according to some embodiments.

FIG. 6 is a block diagram illustrating an example geographic location consensus determination involving two different geographic locations. In the illustrated embodiment, system 600 includes server 310, user device 320, and database 250 for processing a transaction request 604 from a payment application 630.

Payment application 630, in the illustrated embodiment, sends a transaction request 604 to server 310. Based on this request server 310 collects edge server information 650 from an edge server 340 and requests location information from user device 320. User device 320, in the illustrated embodiment, then provides Wi-Fi hotspot information 610 and IP address information 620 to server 310. In the illustrated embodiment, location information 610 and 650 indicate "Portugal" as a geographic location associated with their respective data sources, while location information 620 indicates "Spain" as a geographic location. Using this location information, consensus module 212 accesses database 250 to determine whether a consensus exists between the three geographic locations indicated in the received location information and to select a set of transaction rules (e.g., rules 602 or 608) accordingly. In the illustrated embodiment, after selecting a set of transaction rules, server 310 processes transaction request 604 and transmits a transaction decision 606 to payment application 630.

In some embodiments, consensus threshold policy 256 specifies that a consensus threshold is satisfied if two or more location determination operation results for user device 320 match. In the illustrated example, server 310 selects the set of transaction rules 608 for Portugal based on the Wi-Fi data source and the edge server data source indicating Portugal. In some embodiments, consensus threshold policy 256 specifies weights for one or more location determination operation data sources when determining a geographic region for user device 320. For example, policy 256 may specify to weight edge server location information greater than Wi-Fi and/or IP address location information. In some embodiments, policy 256 specifies a threshold number of location determination operation results that must match in order for a geographic region associated with those results to be assigned to user device 320 during transaction processing.

In some embodiments, server 310 instructs the user of user device 320 to log into a payment application installed on another of their devices in order to obtain location information from the other device. For example, the user may log into a payment application installed on their mobile device. In this example, the mobile device may supply GPS data, cellular tower location information, information collected by various sensors on the mobile device (e.g., Bluetooth, camera), Wi-Fi information, native geographic location associated with the operating system (OS) of the mobile device, etc. to server 310 for use in determining a geographic region for user device 320.

In some embodiments, server 310 may decide to remove results of geographic location operations from a location consensus determination when the data sources of those operations are easily changed or influenced by a user. For example, server 310 may consider location results determined from cellular towers, but may remove location results determined from Wi-Fi access points.

In some embodiments, after assigning a geographic region to user device 320 for a particular transaction, server 310 performs an additional evaluation for the transaction.

For example, if the assigned geographic region is below a threshold size (e.g., 1000, 10,000, 100,000 square miles), server 310 may provide transaction information to the user for multiple geographic regions surrounding the assigned geographic region. As one specific example, server 310 may provide promotional offers or services for countries surrounding Singapore when the user device has been determined to be location in Singapore.

In some embodiments, user device 320 is determined to be located in a geographic region that indicates that their geographic region will soon change. For example, the user device may be located at or near an airport, highway, country border, etc. In such situations, server 310 may suspend processing of a transaction requested by user device 320 and may continue to monitor the user device location for a given period of time.

Example Methods

Figure 7:
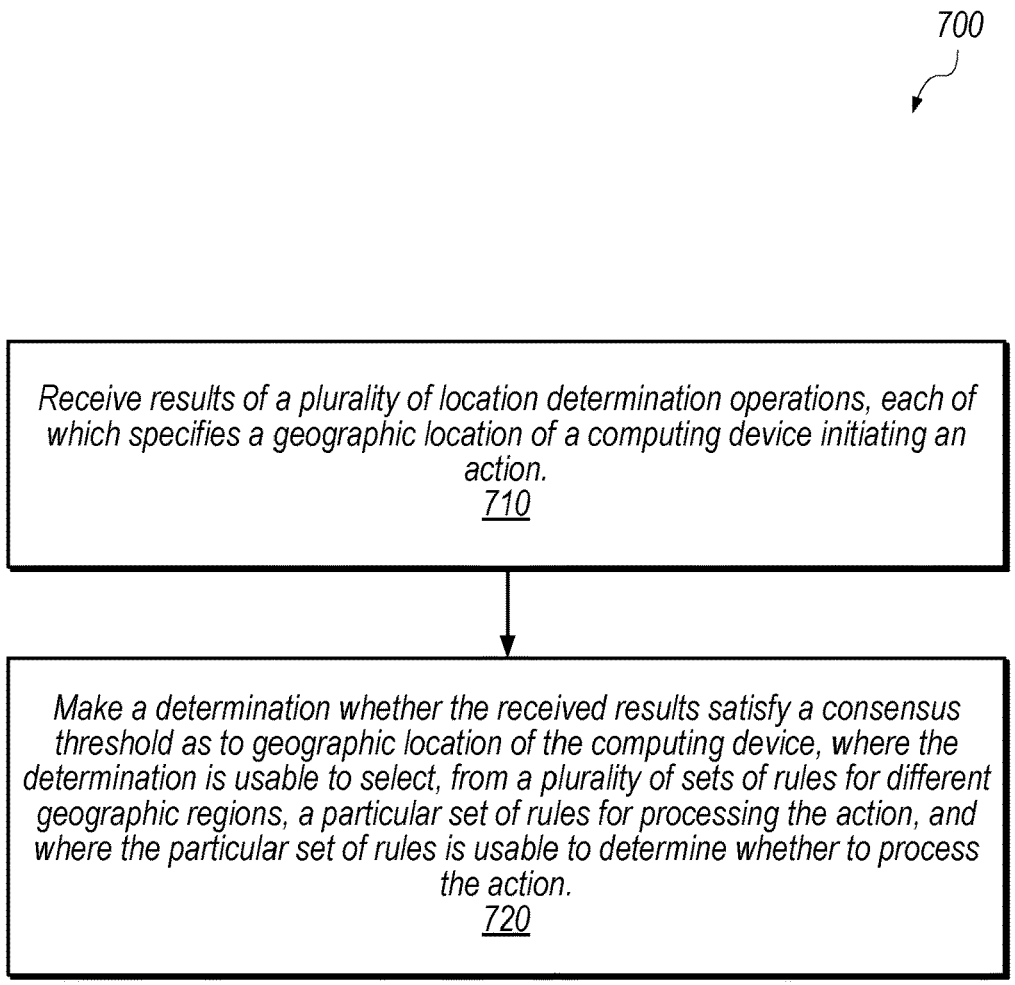
FIG. 7 is a flow diagram illustrating a method for determining whether to process an action based on location determination operation results satisfying a consensus threshold, according to some embodiments.

FIG. 7 is a flow diagram illustrating a method for determining whether to process an action based on location determination operation results satisfying a consensus threshold. The method 700 shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

Method 700 includes references to a "computer system" and a "computing device." The method relates to a determination of geographic location of the computing device. Method 700 is worded such that the steps may either be performed by the computing device itself or by a separate computer system. In the former scenario, the "computer system" and the "computing device" are one in the same, while in the latter scenario, the "computer system" and the "computing device" are different.

At 710, in the illustrated embodiment, a computer system receives results of a plurality of location determination operations, each of which specifies a geographic location of a computing device initiating an action. In some embodiments, the computing device is a user device that receives results of location determination operations that specify geographic locations determined for the user device. In some cases, the results of the location determination operations are received based on a user of the computing device initiating an action. In some embodiments, the computing device is a user computing device and the computer system is a server computer system in communication with the user computing device.

In some embodiments, the plurality of location determination operations includes at least two types of the following types of operations: cellular tower identification, Wi-Fi server set identification, IP address identification, edge server identification, global positioning system (GPS) data identification. For example, the results of the plurality of location determination operations may include geographic locations determined based on: locations of cellular towers interacting with the computing device, Wi-Fi hotspots accessed by the computing device, an autonomous system associated with the IP address of the computing device, an edge server accessed by the computing device, GPS data generated by the computing device, etc.

In some embodiments, the plurality of location determination operations includes a first location determination operation performed by the user computing device and a second location determination operation performed by the server computer system. For example, the first location determination operation may include a Wi-Fi server set identification operation and the second location determination operation may include an edge server identification operation. In some embodiments, performing the second location determination operation includes: determining that the user computing device has viewed content from an edge server of a content delivery network (CDN) and identifying, based on the determining, a particular geographic location for the second location determination operation. In some embodiments, the particular geographic location corresponds to the geographic location of the edge server.

At 720, the computer system makes a determination whether the received results satisfy a consensus threshold as to geographic location of the computing device. In some embodiments, the determination is usable to select, from a plurality of sets of rules for different geographic regions, a particular set of rules for processing the action. In some embodiments, the particular set of rules is usable to determine whether to process the action. In some embodiments, the action is a payment transaction and the particular set of rules specifies a set of payment rules. In some embodiments, the particular set of rules is further selected based on historical geographic location information associated with the computing device. For example, the historical geographic location information associated with the computing device may specify a length of time that the computing device has been in a particular geographic region (e.g., 90 days). The particular set of rules may specify payment rules associated with a particular geographic region (e.g., the United States). In some embodiments, the determination whether the received results satisfy a consensus threshold is made according to a location consensus threshold policy received from the server computer system. In some embodiments, the location consensus threshold policy specifies how to process a transaction and/or whether to process a transaction requested by a user device.

In some embodiments, the computer system selects, from a plurality of rules for different geographic regions, the particular set of rules for processing the action. In some embodiments, the computer system determines, based on the particular set of rules, whether to process the action. In some embodiments, the computer system determines, based on the particular set of rules, how to process the action. In some embodiments, in response to making the determination that the received results do not satisfy the consensus threshold, the computer device causes display, via a user interface of the computing device, an instruction that specifies to perform one or more actions. For example, the computer system may request that a user of the computing device provide authentication information (e.g., login credentials). In some embodiments, the computer system selects, based on a user performing the one or more actions, a particular set of rules from the plurality of sets of rules. In some embodiments, the one or more user actions include one or more additional location determination operations.

In some embodiments, a computing system receives a request to process an action to be performed, where processing of the action is dependent on a particular location of a user computing device. In some embodiments, the computing system performs, a plurality of location determination operations for the user computing device, where each location determination operation determines a geographic location of the user computing device using a different data source. In some embodiments, the computing device analyzes the different determined geographic locations to determine whether a consensus exists between the geographic locations. In some embodiments, the computing system selects, based on the analyzing, between a first set of rules applicable for a determined consensus and a second set of rules applicable for a determined lack of a consensus. In some embodiments, the computing system determines, based on the selected set of rules, whether to process the action. In some embodiments, the computing system is a server computing system configured to process payment transactions.

Example Method

Figure 8:
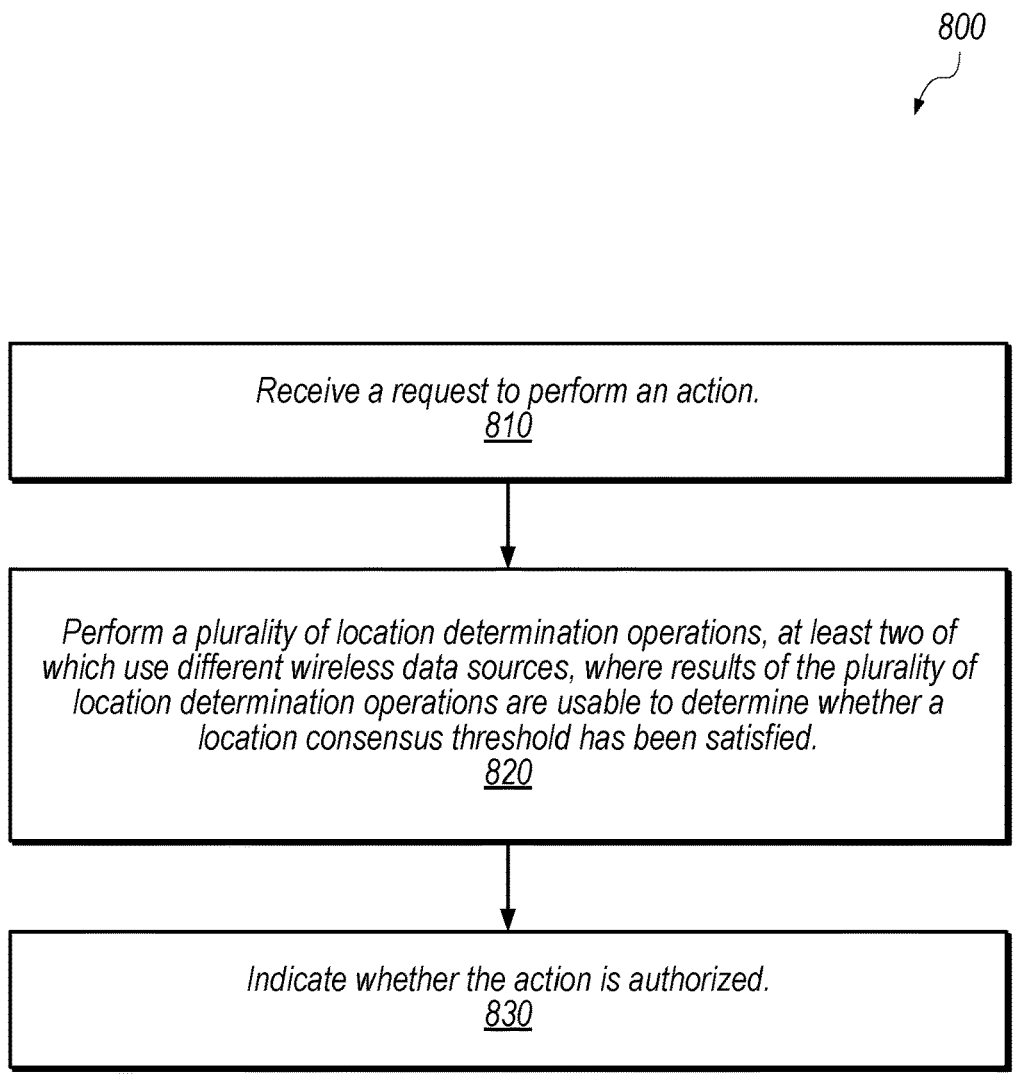
FIG. 8 is a flow diagram illustrating a method for performing a plurality of location determination operations to determine whether to authorize an action, according to some embodiments.

FIG. 8 is a flow diagram illustrating a method for performing a plurality of location determination operations to determine whether to authorize an action. The method 800 shown in FIG. 8 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 810, in the illustrated embodiment, a user computing system receives a request to perform an action. For example, an action may be initiated at the user computing system and may include one or more of the following: a request to access information (e.g., a user account, a file, etc.), a request to copy information, a request to perform a payment, etc. or any other type of user-initiated action discussed above. In some embodiments, the action is a transaction (e.g., a payment transaction).

At 820, the user computing system performs a plurality of location determination operations, at least two of which use different wireless data sources. In some embodiments, results of the plurality of location determination operations are usable to determine whether a location consensus threshold has been satisfied. In some embodiments, the plurality of location determination operations that use different wireless data sources include at least two of the following operations: determining one or more cellular tower identifiers that identify one or more cellular towers interfacing with the user computing system, determining one or more server set identifiers (SSIDs) for one or more Wi-Fi access points being accessed by the user computing system, determining, based on an internet protocol (IP) address associated with the user computing system, a computer network of the user computing system, and accessing geographic location information from a global positioning system (GPS) of the user computing system.

In some embodiments, the results of the plurality of location determination operations indicate geographic regions. In some embodiments, the user computing system determines, based on a comparison of geographic regions indicated by the plurality of location determination operations, whether a location consensus threshold is satisfied. In some embodiments, in response to determining that the location consensus threshold is not satisfied, the user computing system displays, via a user interface, an instruction that specifies to provide authentication information for the user of the user computing system via the user interface. In some embodiments, the user computing system processes the transaction based on receiving the authentication information from a user of the user computing system.

In some embodiments, the user computing system receives, from the transaction computing system, a location consensus threshold policy. In some embodiments, the user computing system determines, according to the location consensus threshold policy, whether the geographic regions satisfy a location consensus threshold. In some embodiments, the location consensus threshold policy specifies one or more actions to be performed if the geographic regions do not satisfy the location consensus threshold.

In some embodiments, the user computing system receives, from a transaction processing server, a plurality of sets of rules for different geographic regions. In some embodiments, the user computing system determines whether the results of the plurality of location determination operations satisfy the location consensus threshold. In some embodiments, the user computing system selects, based on the determining, a set of rules from the plurality of sets of rules received from the transaction processing server. In some embodiments, the user computing system determines, based on the selected set of rules, whether to process the action. In some embodiments, based on the selected set of rules indicating to authorize processing of the action, the user computing system: selects, based on geographic regions indicated by the location determination operations, a particular geographic region and displays, via a user interface, a transaction decision and a selectable element. In some embodiments the selectable element is selectable to cancel the transaction. For example, the selectable element may be a button or a link rendered in the user interface.

In some embodiments, the user computing system receives, from a transaction processing server, a plurality of sets of rules for different geographic regions and a location consensus threshold policy, where the plurality of sets of rules are usable to determine whether to process the action. In some embodiments, the location consensus threshold policy specifies one or more actions to be performed if the results of the plurality of location determination operations do not satisfy the location consensus threshold.

In some embodiments, the user computing system selects between a first set of rules applicable for a determination that the results of the at least two location determination operations satisfy the location consensus threshold and a second set of rules applicable for a determination that the results of the two location determination operations do not satisfy the location consensus threshold. For example, the first set of rules may specify how to process a transaction requested by a user of the user computing system and the second set of rules may specify not to process the transaction. In other example situations, the second set of rules specifies one or more additional location determination operations to be performed.

At 830, the user computing system indicates whether the action is authorized. In some embodiments, the indication includes a confirmation message specifying that a payment transaction has been authorized.

Example Method

FIG. 9 is a flow diagram illustrating a method for utilizing sets of rules for different geographic regions to process an action initiated at a user computing device. The method 900 shown in FIG. 9 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 910, in the illustrated embodiment, a server computing system maintains, for different geographic regions, at least two different sets of rules for performing an action via an information service. In some embodiments, the server computing system is a transaction processing server configured to process a transaction requested at a user computing system. The information service may include a database storing various rules associated with different geographic regions and may update these rules periodically.

At 920, the server computing system maintains location consensus criteria for one or more user computing devices using the information service. For example, the location consensus may specify, for a particular user computing device, a threshold number of geographic locations, determined for that device, that must correspond to the same geographic region in order for that geographic region to be assigned to the particular user computing device. The information service may include one or more databases for storing location information associated with different geographic regions or jurisdictions. In some embodiments, the location consensus criteria are usable to select, using results of a plurality of location determination operations, one of the at least two different sets of rules. In some embodiments, the location consensus criteria specify weights for the results of the plurality of location determination operations.

At 930, the server computing system receives an indication of a request from a user computing device to initiate the action. In some embodiments, the server computing system initiates one or more location determination operations, each of which specifies a geographic location of the user computing device requesting to initiate the action. In some embodiments, the results of the one or more location determination operations are usable to determine whether to process the action. In some embodiments, a user of the user computing device is a consumer initiating a transaction with a merchant.

At 940, the server computing system utilizes the at least two different sets of rules and the location consensus criteria to determine a particular set of rules for processing the action. In some embodiments, the utilizing includes: determining whether the results of the plurality of location determination operations satisfy the location consensus criteria and applying, based on the determining, the particular set of rules for processing the action.

In some embodiments, a server computing system receives an indication of a request of a user to perform a transaction. In some embodiments, the server computing system identifies an edge server of a content delivery network (CDN) that has been accessed by a computing device associated with the user. In some embodiments, the server computing system uses the identified edge server to determine a geographic location of the computing device. In some embodiments, the server computing system selects, based on the determined geographic location, a set of rules for processing the transaction. In some embodiments, the indication specifies that a user of the computing device has requested processing of a payment transaction.

In some embodiments, the server computing system receives, from the computing device, a determination that indicates whether the results of the plurality of location determination operations satisfy the location consensus threshold. For example, a transaction processing application installed on the user device may compare geographic locations specified in the results to decide which geographic region in which the user device is currently located. In some embodiments, the server computing system selects, based on receiving the determination from the computing device (e.g., the user device), a set of rules from the plurality of sets of rules, where the selecting is based on a geographic region specified in the received determinations.

Evaluating location information obtained from various different data sources may advantageously allow a computer system to make an accurate location determination for a user device requesting transaction processing. Specifically, location determination techniques described herein may improve the accuracy of a location determination even in situations where the user device is relocating often, is near a border between two geographic regions, is attempting to obscure their true location, or any combination thereof. This may, in turn, assist transaction processing systems in providing appropriate services and processing for transactions requested by various users, as well as allowing such systems to utilize the correct transaction processing rules associated with a geographic region determined using disclosed techniques.

Example Computing Device

Figure 10:
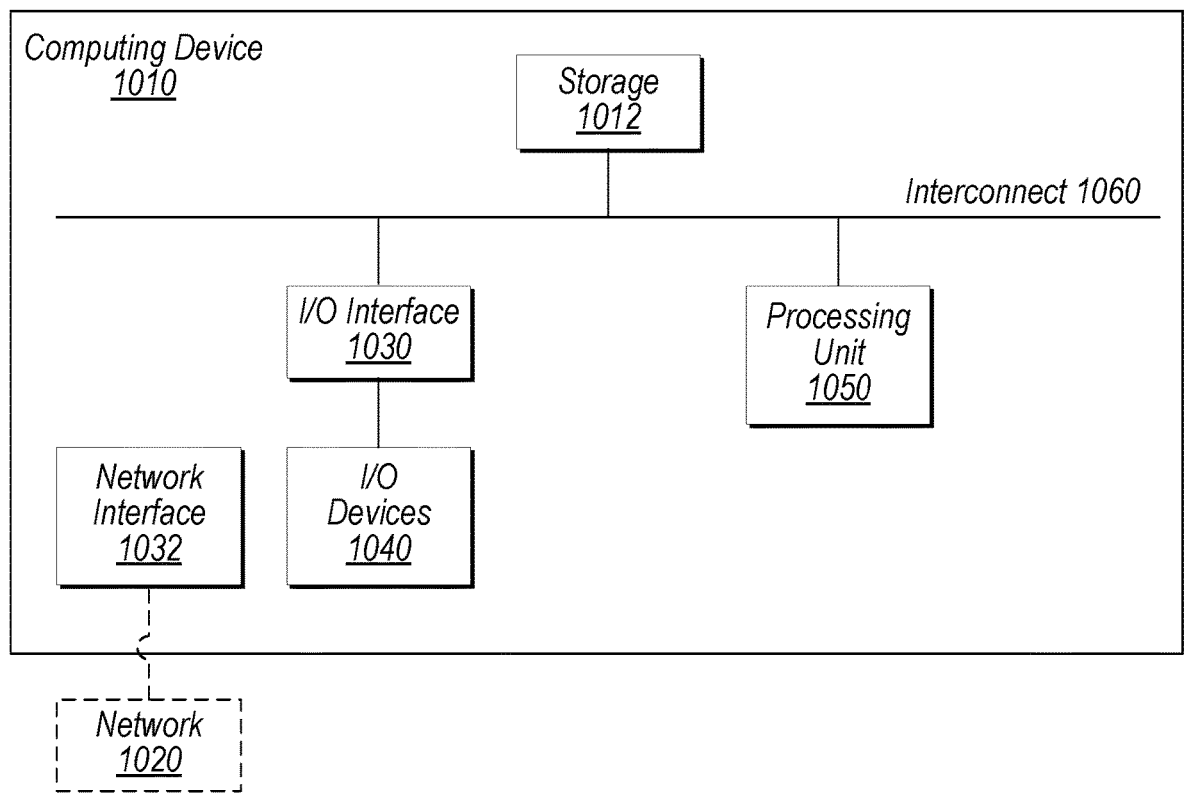
FIG. 10 is a block diagram illustrating an example computing device, according to some embodiments.

Turning now to FIG. 10, a block diagram of one embodiment of computing device (which may also be referred to as a computing system) 1010 is depicted. Computing device 1010 may be used to implement various portions of this disclosure. Computing device 1010 may be any suitable type of device, including, but not limited to, a personal computer system, desktop computer, laptop or notebook computer, mainframe computer system, web server, workstation, or network computer. As shown, computing device 1010 includes processing unit 1050, storage 1012, and input/output (I/O) interface 1030 coupled via an interconnect 1060 (e.g., a system bus). I/O interface 1030 may be coupled to one or more I/O devices 1040. Computing device 1010 further includes network interface 1032, which may be coupled to network 1020 for communications with, for example, other computing devices.

In various embodiments, processing unit 1050 includes one or more processors. In some embodiments, processing unit 1050 includes one or more coprocessor units. In some embodiments, multiple instances of processing unit 1050 may be coupled to interconnect 1060. Processing unit 1050 (or each processor within 1050) may contain a cache or other form of on-board memory. In some embodiments, processing unit 1050 may be implemented as a general-purpose processing unit, and in other embodiments it may be implemented as a special purpose processing unit (e.g., an ASIC). In general, computing device 1010 is not limited to any particular type of processing unit or processor subsystem.

Storage subsystem 1012 is usable by processing unit 1050 (e.g., to store instructions executable by and data used by processing unit 1050). Storage subsystem 1012 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1012 may consist solely of volatile memory, in one embodiment. Storage subsystem 1012 may store program instructions executable by computing device 1010 using processing unit 1050, including program instructions executable to cause computing device 1010 to implement the various techniques disclosed herein.

I/O interface 1030 may represent one or more interfaces and may be any of various types of interfaces configured to couple to and communicate with other devices, according to various embodiments. In one embodiment, I/O interface 1030 is a bridge chip from a front-side to one or more back-side buses. I/O interface 1030 may be coupled to one or more I/O devices 1040 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
receiving, by a server computer system, location results of one or more location determination operations, each of which specifies a geographic location of a computing device that is different from the server computer system and is initiating an action, wherein the one or more location determination operations include at least a global positioning system (GPS) data identification;
performing, by the server computer system, a location determination operation, including identifying a location of an edge server accessed by the computing device to retrieve content, wherein the identifying includes:
accessing respective lists of computing devices maintained by one or more edge servers, wherein the respective lists indicate one or more computing devices that have accessed the one or more edge servers;
determining, based on scraping the respective lists of computing devices, whether the computing device initiating the action is included on one or more of the respective lists; and
storing, based on determining that the computing device initiating the action is included on one or more lists, a location of the one or more edge servers storing the one or more lists that include the computing device initiating the action; and
comparing, by the server computer system, the received location results and the location of the edge server to determine whether one or more of the locations are located within the same geographic region; and
making, by the server computer system based on the comparing and according to a consensus threshold policy, a determination whether the locations satisfy a consensus threshold as to geographic location of the computing device;
wherein the determination is usable to select, from a plurality of sets of rules for different geographic regions, a particular set of rules for processing the action, and wherein the particular set of rules is usable to determine whether to process the action.

2. The method of claim 1, wherein the action is a payment transaction, and wherein the particular set of rules is further selected based on historical geographic location information for the computing device, and wherein the particular set of rules specifies a set of payment rules.

3. The method of claim 1, wherein the computing device is a user computing device, and wherein the server computer system is in communication with the user computing device.

4. The method of claim 3, wherein the one or more location determination operations includes a first location determination operation performed by the user computing device and a second location determination operation performed by the server computer system.

5. The method of claim 4, wherein performing the second location determination operation includes:
determining that the user computing device has viewed content from an edge server of a content delivery network (CDN); and
identifying, based on the determining, a particular geographic location for the second location determination operation, wherein the particular geographic location corresponds to the geographic location of the edge server.

6. The method of claim 1, further comprising:
selecting, by the server computer system from the plurality of sets of rules for different geographic regions, the particular set of rules for processing the action; and
determining, by the server computer system based on the particular set of rules, whether to process the action.

7. The method of claim 1, further comprising:
in response to making a determination that the locations do not satisfy the consensus threshold, causing display of, via a user interface of the computing device, an instruction that specifies to perform one or more actions; and
selecting, based on a user performing the one or more actions, a particular set of rules from the plurality of sets of rules, wherein the one or more actions include one or more additional location determination operations.

8. The method of claim 1, wherein the one or more location determination operations further include at least one type of the following types of operations: cellular tower identification, Wi-Fi server set identification, and IP address identification.

9. The method of claim 1, wherein the one or more location determination operations further include other computing device geographic location information identification, wherein one or more other computing devices used for the other device information identification are known to be located in a given geographic region.

10. The method of claim 1, wherein the one or more location determination operations for which the server computer system receives location results include performing at least one of the following operations:

determining one or more cellular tower identifiers that identify one or more cellular towers interfacing with the computing device;

determining one or more server set identifiers (SSIDs) for one or more Wi-Fi access points being accessed by the computing device; and determining, based on an internet protocol (IP) address associated with the computing device, a computer network of the computing device.

11. A non-transitory computer-readable medium having instructions stored thereon that are executable by a user computing system to perform operations comprising:

receiving a request to perform an action;

performing a plurality of location determination operations, at least one of which is performed using a global positioning system (GPS) data source, wherein results of the plurality of location determination operations and results of a location determination of an edge server accessed by the user computing system to retrieve content that is determined by a server computer system are usable to determine, based on whether the one or more of the results indicate the same geographic region, whether a location consensus threshold has been satisfied, wherein results of the location determination of the edge server are determined by:

accessing respective lists of computing devices maintained by one or more edge servers, wherein the respective lists indicate one or more computing devices that have accessed the one or more edge servers;

determining, based on evaluating the respective lists of computing devices, whether the computing device initiating the action is included on one or more of the respective lists; and storing, based on determining that the computing device initiating the action is included on one or more lists, a location of the one or more edge servers; and indicating whether the action is authorized.

12. The non-transitory computer-readable medium of claim 11, wherein the operations further comprise:

receiving, from a transaction processing server, a plurality of sets of rules for different geographic regions;

determining whether the results of the plurality of location determination operations satisfy the location consensus threshold;

selecting, based on the determining, a set of rules from the plurality of sets of rules received from the transaction processing server; and determining, based on the selected set of rules, whether to process the action.

13. The non-transitory computer-readable medium of claim 11, wherein the operations further comprise:

receiving, from a transaction processing server, a plurality of sets of rules for different geographic regions and a location consensus threshold policy, wherein the plurality of sets of rules are usable to determine whether to process the action, and wherein the location consensus threshold policy specifies one or more actions to be performed if the results of the plurality of location determination operations do not satisfy the location consensus threshold.

14. The non-transitory computer-readable medium of claim 11, wherein the operations further comprise:

selecting between a first set of rules applicable for a determination that the results of the plurality of location determination operations satisfy the location consensus threshold and a second set of rules applicable for a determination that the results of the location determination operations do not satisfy the location consensus threshold.

15. The non-transitory computer-readable medium of claim 11, wherein the plurality of location determination operations that use different wireless data sources further include at least one of the following operations:

determining one or more cellular tower identifiers that identify one or more cellular towers interfacing with the user computing system;

determining one or more server set identifiers (SSIDs) for one or more Wi-Fi access points being accessed by the user computing system; and determining, based on an internet protocol (IP) address associated with the user computing system, a computer network of the user computing system.

16. A non-transitory computer-readable medium having instructions stored thereon that are executable by a user computing system to perform operations comprising:

receiving a request to perform a transaction via a transaction computing system;

performing a first location determination operation, including determining, based on a global positioning system (GPS) data source, a first geographic location of the user computing system;

receiving a result of a second location determination operation performed at the transaction computing system, wherein the second location determination operation includes:

accessing respective lists of computing devices maintained by one or more edge servers, wherein the respective lists indicate one or more computing devices that have accessed the one or more edge servers;

determining, based on the respective lists of computing devices, whether the user computing device initiating the transaction is included on one or more of the respective lists; and storing, based on determining that the computing device initiating the transaction is included on one or more lists, a location of the one or more edge servers storing the one or more lists that include the computing device initiating the transaction; and using results of a plurality of location determination operations that include the first and second location determination operations to:

perform a comparison of geographic regions indicated by the plurality of location determination operations to determine whether one or more of the results are located within the same geographic region; and select, based on the comparison, a particular one of a plurality of different sets of rules for processing the transaction.

17. The non-transitory computer-readable medium of claim 16, wherein the plurality of location determination operations further include at least one type of the following types of determination operations: cellular tower identification, Wi-Fi server set identification, and IP address identification.

18. The non-transitory computer-readable medium of claim 16, wherein the operations further comprise:

determining, based on performing the comparison, whether a location consensus threshold is satisfied;

in response to determining that the location consensus threshold is not satisfied, displaying, via a user interface, an instruction that specifies to provide authentication information for the user of the user computing system via the user interface; and processing the transaction based on receiving the authentication information from a user of the user computing system.

19. The non-transitory computer-readable medium of claim 16, wherein performing the comparison of geographic regions indicated by the location determination operations includes:

receiving, from the transaction computing system, a location consensus threshold policy; and determining, according to the location consensus threshold policy, whether the geographic regions satisfy a location consensus threshold, wherein the location consensus threshold policy specifies one or more actions to be performed if the geographic regions do not satisfy the location consensus threshold.

20. The non-transitory computer-readable medium of claim 16, wherein the operations further comprise, based on the selected set of rules indicating to authorize processing of the transaction:

selecting, based on geographic regions indicated by the location determination operations, a particular geographic region; and displaying, via a user interface, a transaction decision and a selectable element, wherein the selectable element is selectable to cancel the transaction.

\* \* \* \* \*